March 27, 1956  L. W. PLYMPTON, JR., ET AL  2,740,108
SPEED INDICATING DEVICE
Filed June 11, 1954
*Fig. 1.*
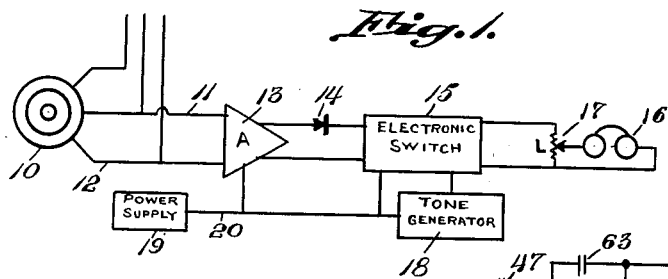
*Fig. 2.*
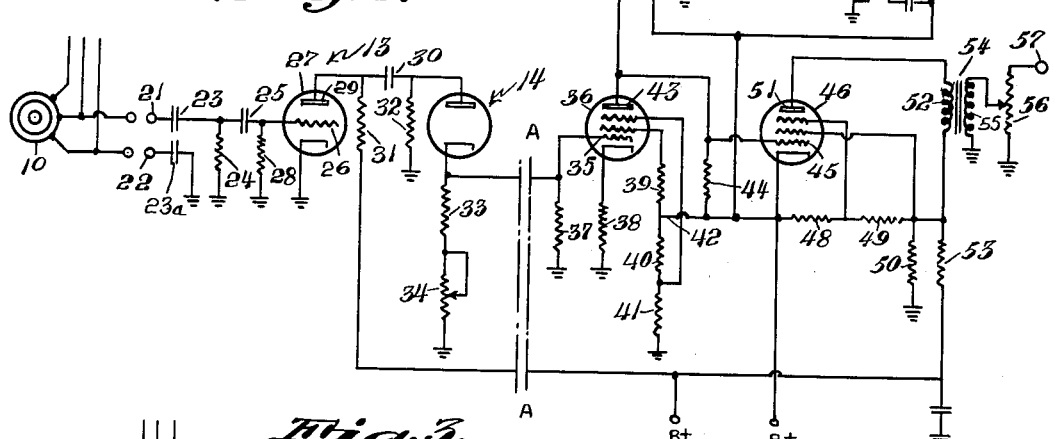
*Fig. 3.*
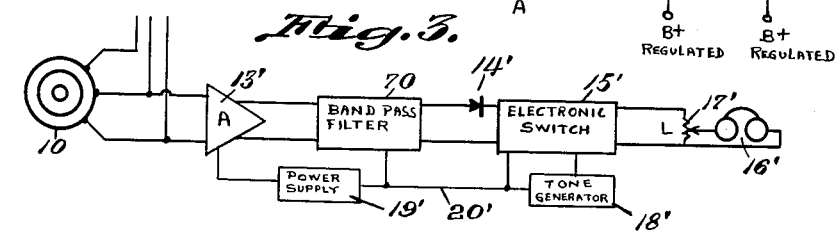
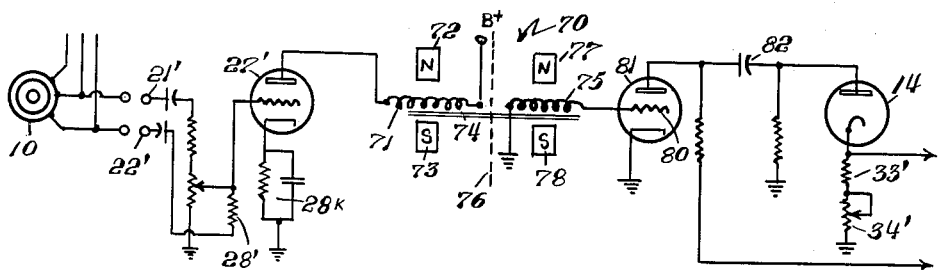
*Fig. 4.*
INVENTORS.
Leon W. Plympton, Jr.
Harold C. Jones
BY
Barlow & Barlow
ATTORNEYS.

United States Patent Office 2,740,108
Patented Mar. 27, 1956

2,740,108

SPEED INDICATING DEVICE

Leon W. Plympton, Jr., and Harold C. Jones, Warwick, R. I., assignors to New England Helicopter Service, Inc., a corporation of Rhode Island Application June 11, 1954, Serial No. 436,007

2 Claims. (Cl. 340—263)

This invention relates to a speed indicating device and more particularly to apparatus of a character which will give a signal when a machine supervised by the instrument falls below a predetermined normal shaft speed.

Our present invention is devised particularly as a solution to the problem of under speed rotation of a main rotor in a helicopter. Helicopters are normally fitted with a speed indicating device for the main rotor, which consists of a dial indicator that is calibrated in R. P. M. To secure proper operation of a helicopter, it has been proven desirable that the shaft should remain at a relatively constant speed and that all control functions pursuant to flying the ship shall be controlled by adjusting the pitch and attitude of the rotor blade. Sometimes in maneuvering the ship, the speed of the main rotor will either exceed or be under the desired range of the speeds which have been found suitable for the operation of the particular ship in question. When this happens, the pilot is generally too busy with his maneuver to notice the dial indicator, and it is therefore desirable that some audible and/or visual signal be provided in addition to the R. P. M. indicator to warn the pilot of the improper operation of the helicopter. Our device, of course, has other applications and may be used whenever an under speed and over speed alarm circuit is necessary to the proper operation of machinery.

It is therefore an object of our invention to provide a device which will indicate variations from normal speed of a rotating shaft.

It is also an object of our invention to provide a speed indicating device employing an alternating current generator which will be directly coupled to the shaft of the rotating device.

A further object of our invention is to provide an electronic indicating device in combination with an alternating current generator which will provide an audible signal when the shaft to which the apparatus is coupled rotates at a speed that varies from normal.

A still further object of the invention is to provide the control of an amplifier which is immediately responsive when the under or over speed limits have been attained.

With these and other objects in view, the invention consists of certain novel features of construction as will be more fully described and particularly pointed out in the appended claims.

In the accompanying drawings:

Figure 1 is a block diagram of one form of our device.

Figure 2 is a schematic diagram of the apparatus shown in Figure 1;

Figure 3 is a block diagram of another form of our device;

Figure 4 is a schematic diagram of an alternate form of a front end for the device shown in Figure 2.

In proceeding with our invention, we connect an amplifier to a source of varying frequency and varying voltage in the form of an alternating current generator that is mechanically coupled to a rotating shaft. We suitably detect this amplified voltage from either a frequency or voltage standpoint and apply this detected voltage to a control amplifier which renders conductive or non-conductive a further amplifying tube to which there has been applied to the input thereof an audible tone signal.

Referring to the drawings, we show in Figure 1 an alternating current generator 10 of the three-phase type. This generator 10 may be a single-phase generator if desired, inasmuch as only one phase of the voltage is being utilized as shown by leads 11 and 12 leading therefrom. These leads of a single phase are coupled to an amplifier 13, the output of which is in turn fed through a rectifying device 14 and thence through an electronic switch 15 to the head set or other output means 16. A tone generator 18 is coupled to the electronic switch 15, and a variable potentiometer 17 is utilized to control the output level to the head set 16. A power supply 19 is shown coupled by lead 20 to the amplifier, electronic switch, and tone generator to provide suitable voltages for the operation of these devices.

Referring now to Figure 2 in which the filament connections have been eliminated for sake of clarity, the output of one phase of the alternating generator 10 is shown coupled to input terminals 21 and 22 of the electronic device. Blocking capacitors 23, 23a are connected to the input terminals 21, 22, respectively, and a load resistance 24 is connected across the output of the input blocking capacitors. The signal is then fed through the grid coupling capacitor 25 to the grid 26 of the triode amplifier tube 27, the usual grid leak 28 being provided. The plate 29 of the amplifier tube 27 is connected through a coupling capacitor 30 to the diode rectifier 14, a plate load resistor 31 and diode load resistor 32 being provided. A D. C. signal, therefore, appears across resistors 33, 34 and is applied to the grid 35 of control tube 36, a grid leak 37 being provided for the control tube 36.

Control tube 36 is of the sharp cut-off type and is here shown as a pentode which, for example, may be the type 6BN6. This particular type of tube produces a very sharp plate current rise for very small changes in grid voltage and is therefore very responsive to minute changes of voltage developed across resistors 33, 34. Cathode resistance 38 and the voltage divider network consisting of resistances 39, 40, and 41 set the operating level for the control tube 36, the voltage divider network being connected to the source of high voltage as at 42. The plate 43 of the control tube 36 has a load resistor 44 connected between it and the source of high voltage. Additionally, the plate 43 is directly coupled to the grid 45 of the switch tube 46 which also has connected thereto, through coupling capacitor 47, the output of the tone generator generally designated 18. Since the plate load resistor 44 is in the grid circuit of the switch tube 46, it will be seen that the current through tube 36 serves to control the conduction of switch tube 46 by the voltage drop across resistor 44. Thus, with tube 36 conducting, the voltage drop across resistor 44 is of a sufficient magnitude to prevent tube 46 from conducting.

A voltage divider network 48, 49, 50 is provided for the screen and suppressor of the switch tube 46, which is here shown as a pentode, and the plate 51 is coupled through the primary winding 52 of an output transformer 54 and dropping resistor 53 to a source of high voltage. The output transformer 54 is of the usual impedance matching variety, and in this case the secondary 55 is shown connected across a variable high impedance 56 so as to adjust the output levels thereof to the output terminal 57.

The tone generator 18 or audio oscillator is of conventional design including an audio transformer 60 providing the feed back path between the plate and grid circuits of the triode 61, the usual grid leak 62 being provided to supply suitable bias to the grid of the triode 61. It will be noted that the output of the oscillator is coupled by capacitor 63 to a second triode section 64 so as to provide proper isolation of the oscillator circuit from the output switching circuits. Obviously other forms of audio oscillators may be substituted for the one shown, this being merely exemplary of one type that may be used.

In operation, the circuitry of Figure 2 is sensitive primarily to varying voltages produced by the alternating generator 10 which are proportional to the speed of the rotating shaft to which the alternator 10 is coupled. The A. C. voltage produced by the alternator 10 is suitably amplified in tube 27 and rectified by the rectifying device 14 appearing across resistors 33, 34 as a D. C. component. With the shaft to which alternator 10 is coupled rotating at a proper speed, the voltage output of the alternator will be sufficient so that the rectified voltage appearing across resistors 33 and 34 will be of proper polarity to permit tube 36 to conduct. When the tube 36 is conducting, there is sufficient voltage drop appearing across resistor 44 to bias the grid 45 to cut-off, and therefore the output of the audio oscillator or tone generator 18 will be suppressed. However, as soon as a signal voltage being generated by the alternator 10 falls below a predetermined level, the voltage drop across resistor 33, 34 will become insufficient to allow tube 36 to conduct. With tube 36 not conducting, the resultant voltage drop across resistor 44 will be insufficient to prevent switch tube 46 from conducting and therefore the output of audio oscillator 18 will appear at the terminal 57, thus warning the operator of a low shaft speed.

Referring to Figure 3, we have shown diagrammatically a modification of our alarm device, which in this instance is sensitive to the frequency component being generated by the alternator 10. In this instance an amplifier 13' is again utilized to raise the voltage output of the alternator to a detectable level and is followed by a band pass filter 70 and a rectifying device 14 which as in the previous embodiment is utilized to present a D. C. component of the detected signal to the electronic switch 15.

In the wiring diagram of Figure 4, we show the output of one phase of the alternator 10 being applied to terminals 21', 22', thence through amplifier tube 27 with the usual grid leak resistor 28 and cathode bias arrangement 28k, the output of the amplifier 27' being fed to a band pass filter generally designated 70. In order to secure selectivity of the band pass filter with a sharp rise and fall characteristic, we prefer to utilize a reed vibrating system such as is schematically shown in the drawings. This reed system comprises an exciter coil 71 that is mounted between two permanent magnets 72, 73, the exciter coil 71 surrounding a plurality of reeds 74. The number of reeds is determined by the width of the band being passed, which in this instance is between 46 and 50 cycles. Therefore, we utilize five reeds in such an application. These reeds are of bimetallic temperature compensated material and are gapped, that is, they do not present a continuous magnetic coupling path between the exciter coil 71 and the pick-up coil 75, since that portion of each reed passing through the exciter coil is coupled to that portion of the reed passing through the pick-up coil by a non-magnetic metal. These reeds are additionally surrounded by a pick-up coil 75 which is shielded from magnetic influence of the exciter coil 71 by a shield 76 and which, as with the exciter coil, is mounted within the magnetic field of permanent magnets 7, 8. In a band pass filter of this type the reeds chosen are each resonant at a different frequency. Thus, in the example noted, we utilize a reed resonant at 46, 47, 48, 49, and 50 cycles. When a frequency falling within this pass band is produced by the alternator 10, it will excite one of the reeds. The vibration of one of the reeds will change the magnetic field of coil 75 and induce a signal at the grid 80 of an amplifying tube 81, the output of which may be passed through a coupling capacitor 82 to a rectifying device 14. The output of the rectifying device 14 across resistors 33', 34' may be applied to the grid 35 of tube 36 shown in Figure 2, the entire circuitry of Figure 4 being adapted to replace the front end of Figure 2 by joining the ends of the leads shown in Figure 4 to the dash lines a—a of Figure 2. Should the frequency input to this device be changed to a higher frequency, such as nearing the radio frequency spectrum, it will be understood that the band pass filter may be modified and physically become either a T-section band pass or a pi section band pass type of filter, the design of which is well known to those skilled in the art.

In the operation of the embodiment shown in Figures 3 and 4, the tone produced by the generator 18' will appear in the head phones 16' until the proper frequency is being generated by the alternator 10. As soon as a proper frequency is being generated that falls within the pass band of the filter 70, an A. C. voltage will appear at the grid 80 of the amplifier 81 and will be rectified in the device 14, a D. C. component appearing across resistors 33', 34'. This will in turn make the grid 35 of control tube 36 more positive and permit it to conduct, thereby setting up a voltage drop across resistor 44 of a sufficient magnitude to prevent switch tube 46 from conducting. It will therefore be seen that as soon as the shaft driving alternator 10 rotates at a speed which generates a frequency outside the range for which the device has been designed, a tone signal will appear at the head phones 16' indicating improper operation. In this particular instance, improper operation will be shown as an excessive speed as well as an under speed, which is desirable in certain applications.

We claim:

1. Alarm apparatus for use in connection with a rotating shaft comprising an alternator connected to said shaft and driven thereby, said alternator producing a signal the frequency components of which are proportional to the rotational speed of said alternator, a band pass filter coupled to said alternator, said filter having an input coil and an output coil, said coils solely coupled together through at least one frequency sensitive reed, a tone generator and an electronic switch, said tone generator coupled to said electronic switch, said electronic switch coupled to said output coil to connect and disconnect said tone generator to an output circuit.

2. Alarm apparatus for use in connection with a rotating shaft comprising an alternator connected to said shaft and driven thereby, said alternator producing a signal, the frequency components of which are proportional to the rotational speed of said alternator, a tone generator, an electronic switch, said tone generator coupled to said electronic switch, coupling means between said electronic switch and the output of said alternator, said means exhibiting an electrical characteristic of a band-pass filter with an extremely sharp cut-off at both ends of the band, said coupling means providing substantially no capacitive or inductive path therein, the coupling being excited through natural resonance of an element.

References Cited in the file of this patent
UNITED STATES PATENTS

| | | |
|---|---|---|
| 1,905,996 | Coupleux et al. | Apr. 25, 1933 |
| 2,080,554 | Wolff | May 18, 1937 |
| 2,408,711 | Volz | Oct. 1, 1946 |
| 2,408,930 | Hammond et al. | Oct. 8, 1946 |
| 2,576,585 | Fleming | Nov. 27, 1951 |